United States Patent [19]

Dilling

[11] Patent Number: 5,049,661

[45] Date of Patent: Sep. 17, 1991

[54] SULFONATION OF LIGNINS

[75] Inventor: Peter Dilling, Isle of Palms, S.C.

[73] Assignee: Westvaco Corporation, New York, N.Y.

[21] Appl. No.: 298,677

[22] Filed: Jan. 19, 1989

[51] Int. Cl.$^5$ ................................................ C08H 5/02
[52] U.S. Cl. ...................................... 530/500; 530/501
[58] Field of Search ................................ 530/500, 501

[56] References Cited

U.S. PATENT DOCUMENTS

| | | | |
|---|---|---|---|
| 2,280,600 | 4/1942 | Muller et al. | 530/500 |
| 2,323,022 | 6/1943 | Ferrari et al. | 530/500 |
| 2,680,113 | 6/1954 | Adler et al. | 530/500 |
| 2,789,974 | 4/1957 | Hagglund et al. | 530/500 |
| 2,976,235 | 3/1961 | Sperry | 530/500 |
| 2,985,643 | 5/1961 | Boomer et al. | 530/500 |
| 4,069,217 | 1/1978 | Detroit et al. | 530/500 |
| 4,193,814 | 3/1980 | Shen | 530/500 |
| 4,427,584 | 1/1984 | Le Grand et al. | 530/500 |
| 4,728,727 | 3/1988 | Reintjes et al. | 530/500 |
| 4,739,040 | 4/1988 | Naae et al. | 530/500 |
| 4,739,041 | 4/1988 | Morrow et al. | 530/500 |
| 4,740,590 | 4/1988 | Dilling | 530/500 |
| 4,781,251 | 11/1988 | Naae et al. | 530/502 |

FOREIGN PATENT DOCUMENTS 1176243  10/1984  Canada.
1812042   2/1970  Fed. Rep. of Germany.
 182076   4/1966  U.S.S.R..

OTHER PUBLICATIONS

Polyfon F product bulletin from the Westvaco Corporation.

*Primary Examiner*—John Kight, III
*Assistant Examiner*—Frederick Krass
*Attorney, Agent, or Firm*—Terry B. McDaniel; Daniel B. Reece, IV; Richard L. Schmalz

[57] ABSTRACT

A sulfonated lignin composition suitable for use as an additive in other chemical compositions and processes having improved solubility in aqueous medium at varying pH levels, and a method of producing such sulfonated water-soluble lignin products by reaction of an unsulfonated or a sulfonated starting lignin compound with sulfuric acid having a concentration of at least about 95%, while maintaining the temperature of the reaction below 40° C. for a sufficient time to sulfonate the same. Sulfuric acid sulfonation increases the organically bound sulfonic acid content of the starting lignin compound at least about 1.7 moles sulfonic acid per mole of lignin, while providing water-solubility of the product at a wide range of pH levels.

8 Claims, No Drawings

SULFONATION OF LIGNINS

The present invention is directed to the production of sulfonated lignin compositions suitable for use as additives in other chemical compositions and processes, and, more particularly, to a sulfonated lignin having a high degree of sulfonation and solubility in aqueous medium at varying pH without appreciable precipitation at any degree of concentration.

BACKGROUND OF THE INVENTION

Lignin is a complex, high-molecular weight polymer occurring naturally in close association with cellulose in plants and trees. In the paper-making industry, lignin may be recovered as a by-product of the cellulose product by two principal wood-pulping processes known as a sulfite process and a kraft process. In the sulfite process, lignin is solubilized from the cellulosic portion of the wood pulp by direct sulfonation, while the kraft process is based on an alkaline degradation mechanism causing cleavage of $\beta$-aryl ether linkages in the polymeric lignin which sequentially result in chemical functions of the phenolic and carboxylic type. Kraft process lignin generally is isolated by acid precipitation from the black liquor of the pulping process at a pH below the pKa of the phenolic groups.

Depending on conditions under which the lignin is precipitated, the precipitated lignin may be either in the form of free acid lignin or a lignin salt. If lignin is precipitated at a high pH, such as about 9.5 to 10, the lignin is obtained in the form of a salt. If this lignin is further processed by washing, acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or ammonium salt, is soluble in water, whereas free acid lignin and polyvalent metal salts of lignin are insoluble in water.

Lignin products are widely employed as additives in various chemical processes and compounds. Because of the high degree of chemical activity characteristic of lignin, it has been variously employed as a surfactant, extender, dispersant, reinforcement, absorbent, binder, sequestering agent, emulsifier and emulsion stabilizer, and as a stabilizing and protective colloid. Lignin is sold under the trademark Indulin ® by Westvaco Corporation of North Charleston, S.C. Sulfonated lignin compounds, particularly sodium salts of lignosulfonates, are widely employed as additives and dispersants in textile dyestuffs and printing pigments, and such products have been sold for a number of years under the trademarks Polyfon ® and REAX ® by Westvaco Corporation. The degree of sulfonation of lignin generally determines its water-solubility at various pH levels, e. g., sodium salts of sulfonated lignins are generally water-soluble at alkaline and higher pH levels, while they are water-insoluble at lower or acid pH levels.

Lignosulfonate compounds obtained from the lignin by-product of a kraft pulping process may be produced by treatment of an aqueous solution of the same with an aldehyde compound at an alkaline pH to methylolate the lignin, followed by treatment with sodium sulfite or bisulfite at an acid pH to sulfomethylate the methyol group on the phenolic nucleus of the lignin molecule. The long side chain of the lignin molecule may also be sulfonated by treatment with a sulfite or bisulfite salt.

Napthylene sulfonate compositions suitable for use as additives and dispersants in other chemical compositions, and comparable in some ways to lignosulfonates, have been produced by sulfuric acid sulfonation of napthylene. It is known that benzene and other aromatic compounds can be sulfonated with concentrated sulfuric acid, but as the concentration of the water increases during a reaction, the rate of sulfonation decreases, the reaction rate being inversely proportional to the square of the water concentration. Reaction ceases when the acid concentration reaches a level characteristic of each compound, in the case of benzene, about 78% sulfuric acid.

Much thought has been devoted to methods of carrying out the sulfonation reaction to completion. One approach involves removal of the water as formed, the net result being substantially quantitative utilization of both hydrocarbon and acid. It is also understood that certain lignin materials heretofore have been treated with sulfuric acid, gaseous sulfur trioxide, and/or oleum at varying concentrations to sulfonate the same, but such treatments have not indicated that the sulfonated lignin products are sufficiently water-soluble to be useful commercially as additives in preparation of other products and chemical compositions. Thus, as far as is known, sulfuric acid sulfonation of lignin has not been employed to produce the water-soluble sulfonated lignin products suitable for use as dispersants and additives. This is believed due to condensation reactions occurring with creation of excess water during the sulfonation reaction which causes cross-linking of the lignin, with resultant viscosity build-up and water-insolubility of the lignin.

BRIEF OBJECTS OF THE INVENTION

It is an object of the present invention to provide an improved method for producing a sulfonated lignin product for use as an additive in other chemical compositions and processes and having excellent water solubility and a high degree of sulfonation.

It is another object to provide an improved method of producing water-soluble sulfonated lignin products by direct sulfuric acid sulfonation of lignins.

It is a further object to provide an improved method of increasing the degree of sulfonation of lignins by reaction with concentrated sulfuric acid to produce a water-soluble sulfonated lignin product.

It is a further object to produce improved sulfonated lignin products suitable for use as additives in other chemical processes and compositions.

SUMMARY OF THE INVENTION

The present invention is directed to the production of sulfonated lignin products and an improved method of producing the same by reaction of lignin with concentrated sulfuric acid to provide a highly sulfonated lignin having excellent water solubility. More particularly, it has been found that reaction of a lignin compound with highly concentrated sulfuric acid, i.e., having a concentration of at least about 95% acid, while maintaining the temperature of the reaction below about 40° C., and preferably below about 20° C., provides a highly water-soluble lignosulfonate suitable for use commercially as an additive in other chemical compositions and processes. The lignin subsequently may be neutralized to form an alkali salt by treatment with a compound selected from the group consisting of lithium, sodium, potassium, ammonium, and amine salts.

The described sulfuric acid treatment has been found to provide a water-soluble sulfonated product which exhibits an increase of at least about 1.7 moles of organically bound sulfonic acid per mole of lignin over an unsulfonated starting lignin material. When the starting lignin material is unsulfonated, the lignin after sulfonation with concentrated sulfuric acid may be recovered as a precipitate, washed with water to remove excess acid, and thereafter dissolved in aqueous medium. When the starting lignin material has been previously sulfomethylated, as with formaldehyde and a sulfite or bisulfite compound, further treatment and reaction with concentrated sulfuric acid in accordance with the method of the present invention increases sulfonation in the lignin product which, depending upon its initial degree of sulfonation, is fully dissolved in sulfuric acid and has been found to produce an organically bound sulfonic acid content of up to as much as about 4.1 moles per mole of lignin. Such sulfonated lignin products exhibit essentially complete water solubility at all pH levels.

DETAILED DESCRIPTION OF PREFERRED EMBODIMENTS

Lignin materials, which have been previously sulfomethylated, sulfonated, or are unsulfonated, may be effectively sulfonated by treatment with highly concentrated sulfuric acid, i.e., at least 95%, and preferably 98%, by reaction therewith while maintaining the temperature of the reaction below about 40° C., and preferably below 20 °C., for a sufficient period of time to obtain a sulfonated lignin product which is found water soluble at pH levels which are moderately acid and above.

The degree of solubility of such lignin compounds in aqueous medium may be measured by comparing their acid precipitation numbers, or values. As expressed herein, the acid precipitation number of a lignin compound is the number of grams of a 50% concentration of $H_2SO_4$ needed to start precipitation of a 37 milliliter solution of 0.5 weight percent lignin.

The method of the present invention may be illustrated by the following laboratory examples:

EXAMPLE 1

20 grams of a predried Indulin A lignin (unsulfonated) is dissolved in 80 grams of concentrated (98%) $H_2SO_4$. The temperature of the reaction is maintained below 40 °C., and preferably at or below 20 °C., by outside cooling or by controlled lignin addition. After ten minutes, the $H_2SO_4$/lignosulfonate composition is poured into 500 grams of a mixture of ice and water so that the temperature does not exceed 40 °C. The resulting precipitated lignosulfonate is filtered and washed with sufficient water in order to remove excessive acid but not appreciably dissolve the lignin.

The washed lignin subsequently is neutralized to form an alkali earth metal salt of sodium, and the final product is observed to have a high molecular weight, an organically bound sulfonic acid content of 1.7 moles per mole of lignin, and an acid precipitation number of 10.5.

EXAMPLE 2

A previously sulfomethylated lignin product (REAX 88) is treated with sulfuric acid in accordance with Example 1, and the dissolved solution thereof is diluted with about three times its volume of water and neutralized with lime. The neutralized slurry is filtered to remove calcium sulfate precipitate which forms from the interaction of the lime and sulfuric acid unconsumed in the sulfonation reaction, and to the filtrate is added the requisite amount of sodium carbonate quantitatively to convert the calcium salt of the desired sulfonic acid into its sodium salt. The resultant calcium carbonate precipitate may then be removed by filtration and the filtrate which contains the desired lignin salt evaporated to dryness according to any well-known drying procedure to provide the recovered sulfonated sodium salt of lignin which is fully soluble in aqueous medium at all pH levels.

A number of lignin starting materials were sulfonated by direct sulfuric acid sulfonation in accordance with the present invention, and were compared to prior art products not sulfonated with sulfuric acid. The samples were treated to determine by their acid precipitation numbers (solubility) and sulfonic acid content. The lignin sample which were sulfonated by direct sulfuric acid sulfonation were reacted with 96.1% concentrated sulfuric acid. The lignin samples with their measured acid precipitation numbers and sulfonic acid contents are set forth in the following table:

TABLE 1

ACID PRECIPITATION NUMBER (WATER SOLUBILITY) OF VARIOUS LIGNINS IN RELATION TO THEIR ORGANICALLY BOUND SULFONIC ACID CONTENT

| Sample Number | Lignin | Acid Precipitation Number (Grams of $H_2SO_4$) | Sulfonic Acid Content (Moles/ 1000 g Lignin) |
|---|---|---|---|
| 1 | Indulin, unsulfonated | 0.2 | 0.0 |
| 2 | Indulin (8% moisture) sulfonated with $H_2SO_4$ | 10.5 | 1.7 |
| 3 | Indulin (2% moisture) sulfonated with $H_2SO_4$ | 12.5 | 1.85 |
| 4 | REAX 88 (sulfonated and sulfomethylated with a sulfite compound) | 19.5 | 2.5 |
| 5 | REAX 88 (7% moisture) sulfonated with $H_2SO_4$ | did not precipitate | 4.1 |
| 6 | REAX 83 (sulfomethylated) | 9.2 | 1.82 |
| 7 | REAX 83 (7% moisture) sulfonated with $H_2SO_4$ | did not precipitate | 3.57 |
| 8 | Vanisperse CB (a sulfite lignin) | 1.7 | 0.77 |
| 9 | Vanisperse CB (5% moisture) sulfonated with $H_2SO_4$ | 24.6 | 2.1 |

As indicated in Table 1, Samples 1 - 3 utilized as the starting material an Indulin ® lignin, which is an unsulfonated product. Samples 4 and 5 utilized as the starting material REAX 88, which is a sulfonated and sulfomethylated lignin obtained by methylolation and sulfonation with a sulfite or bisulfite compound. Samples 6 and 7 utilized as the starting material REAX 83, which is a lignin sulfomethylated with a sulfite compound. Samples 8 and 9 are Vanisperse lignins obtained as a partially desulfonated sulfite lignin by-product of a sulfite wood-pulping process.

Samples 1, 4, 6, and 8 of Table 1 represent lignin by-products of the prior art, while Samples 2, 3, 5, 7, and 9 represent sulfonated lignin products which are sulfonated by direct sulfuric acid sulfonation in accordance with the present invention.

As can be seen, from the acid precipitation numbers presented (the acid precipitation number of 0.2 of Sample 1 represents a mildly acidic precipitation pH of approximately 6.5), lignin Samples 2, 3, 5, 7, and 9 exhibit high acid precipitation numbers and, thus, excellent water-solubility at both acid and alkaline pH levels. Samples 5 and 7 indicate, by their lack of precipitation, complete water-solubility at all pH levels. Samples 2 and 3 illustrate the effect of moisture on the precipitation number and sulfonic acid content, while Samples 8 and 9 illustrate the utility of the method of the present invention with sulfite lignins, as well as those lignins derived from a kraft process.

That which is claimed is:

1. A method of producing a sulfonated water-soluble lignin consisting essentially of dissolving a dry lignin compound, recovered as a by-product of the kraft or sulfite wood pulping processes, with sulfuric acid having a concentration of at least about 95% while maintaining the temperature of the reaction below about 40 °C. for a sufficient time to sulfonate the lignin compound.

2. A method as defined in claim 1 wherein the temperature of the reaction is maintained below about 20 °C.

3. A method as defined in claim 1 wherein the lignosulfonate has an increase in organically bound sulfonic acid content of at least about 1.7 moles sulfonic acid per mole of lignin over the lignin starting compound.

4. A method as defined in claim 3 wherein the lignin starting compound is a sulfomethylated lignin compound and wherein the resultant lignosulfonate product has an organically bound sulfonic acid content of up to about 4.1 moles per mole of lignin.

5. A method as defined in claim 1 wherein the sulfonated lignin reaction product precipitates during the reaction, and the lignin precipitate is water washed to an extent to remove excess acid without appreciably dissolving the lignin.

6. A method as defined in claim 1 including the step of neutralizing the precipitated sulfonated lignin product by reaction with an alkali salt selected from the group consisting of lithium, sodium, potassium, ammonium, and amine salts.

7. A method as defined in claim 1 wherein the starting lignin compound is sulfonated and/or sulfomethylated by reaction with a sulfite or bisulfite salt before reaction with sulfuric acid, the sulfuric acid reaction dissolves the lignin, the sulfonated lignin solution is neutralized with lime, filtered, reacted with sodium carbonate to convert the sulfonated lignin to its sodium salt, and again filtered to remove precipitated calcium carbonate from the sulfonated lignin salt solution.

8. A method as defined in claim 1 wherein the sulfuric acid has a concentration of about 98%.

* * * * *